US012621797B2

(12) United States Patent
Hong

(10) Patent No.: US 12,621,797 B2
(45) Date of Patent: May 5, 2026

(54) INFORMATION SENDING METHOD AND APPARATUS, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 476 days.

(21) Appl. No.: 18/033,062

(22) PCT Filed: Oct. 21, 2020

(86) PCT No.: PCT/CN2020/122599
§ 371 (c)(1),
(2) Date: Apr. 20, 2023

(87) PCT Pub. No.: WO2022/082536
PCT Pub. Date: Apr. 28, 2022

(65) Prior Publication Data
US 2023/0397162 A1      Dec. 7, 2023

(51) Int. Cl.
*H04W 68/02* (2009.01)
*H04W 8/18* (2009.01)
(Continued)

(52) U.S. Cl.
CPC .......... *H04W 68/02* (2013.01); *H04W 8/183* (2013.01); *H04W 76/20* (2018.02); *H04W 74/0833* (2013.01); *H04W 74/0836* (2024.01)

(58) Field of Classification Search
None
See application file for complete search history.

(56) References Cited

U.S. PATENT DOCUMENTS

| 2012/0202485 A1 | 8/2012 | Mirbaha et al. |
| 2014/0106747 A1 | 4/2014 | Josso et al. |
(Continued)

FOREIGN PATENT DOCUMENTS

| CN | 101990311 A | 3/2011 |
| CN | 102833699 A | 12/2012 |
(Continued)

OTHER PUBLICATIONS

International Search Report of PCT/CN2020/122599 dated Jul. 21, 2021 with English translation, (4p).
(Continued)

*Primary Examiner* — Gary Lafontant
(74) *Attorney, Agent, or Firm* — Arch & Lake LLP; Hao Tan; Shen Wang

(57) ABSTRACT

Provided in the present disclosure are an information sending method and apparatus, and a storage medium. The information sending method includes: in response to determining that a first SIM card of a multi-card terminal is in service and detecting a paging message for paging the second SIM card that is sent by a second base station, determining whether to respond to a paging, wherein the second base station is a base station where the second SIM card resides; and sending target indication information to the second base station in response to determining not to respond to carry out a paging response, the target indication information being used to inform the second base station that the second SIM card has received the paging message, but not to respond to a paging.

18 Claims, 8 Drawing Sheets

In response to determining that a first SIM card of a multi-card terminal is in service communication and detecting a paging message for paging a second SIM card, determining whether to respond to the paging        101

In response to determining not to respond to the paging, sending target indication information to the second base station        102

(51) Int. Cl.
  *H04W 76/20*    (2018.01)
  *H04W 74/0833*  (2024.01)
  *H04W 74/0836*  (2024.01)

(56)        References Cited

U.S. PATENT DOCUMENTS

| | | | |
|---|---|---|---|
| 2014/0228070 A1 | 8/2014 | Josso et al. | |
| 2015/0223196 A1 | 8/2015 | Kim et al. | |
| 2018/0042054 A1 | 2/2018 | Han | |
| 2018/0270791 A1 | 9/2018 | Park et al. | |
| 2018/0270894 A1 | 9/2018 | Park et al. | |
| 2020/0037380 A1 | 1/2020 | Qiu et al. | |
| 2020/0229132 A1 | 7/2020 | Chen et al. | |
| 2023/0345417 A1* | 10/2023 | Wu ...................... H04W 68/00 | |

FOREIGN PATENT DOCUMENTS

| | | |
|---|---|---|
| CN | 103283290 A | 9/2013 |
| CN | 103404203 A | 11/2013 |
| CN | 109315017 A | 2/2019 |
| CN | 109391905 A | 2/2019 |
| CN | 110313201 A | 10/2019 |
| CN | 110495195 A | 11/2019 |
| CN | 110495208 A | 11/2019 |
| CN | 110603829 A | 12/2019 |
| CN | 110945883 A | 3/2020 |
| CN | 111601260 A | 8/2020 |
| CN | 111602437 A | 8/2020 |
| CN | 111771406 A | 10/2020 |
| WO | 2018053691 A1 | 3/2018 |

OTHER PUBLICATIONS

First Office Action of Chinese Application No. 202080002816.1 dated Sep. 19, 2022 with English translation (13p).
Notice of Allowance issued on Dec. 7, 2023 for counterpart CN patent application No. 2023120700093130 (5 pages).

* cited by examiner

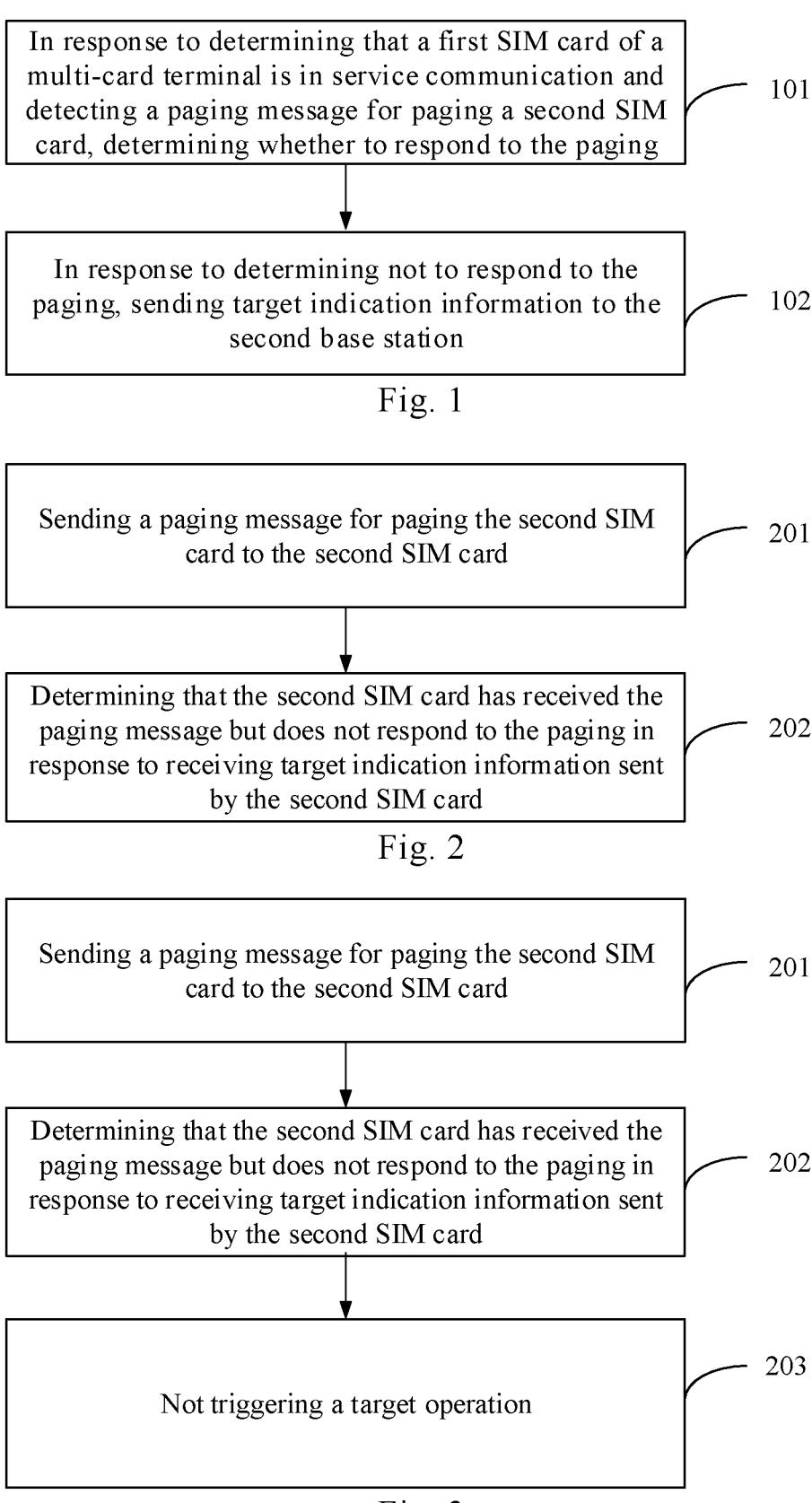

In response to determining that a first SIM card of a multi-card terminal is in service communication and detecting a paging message for paging a second SIM card, determining whether to respond to the paging    101

In response to determining not to respond to the paging, sending target indication information to the second base station    102

Fig. 1

Sending a paging message for paging the second SIM card to the second SIM card    201

Determining that the second SIM card has received the paging message but does not respond to the paging in response to receiving target indication information sent by the second SIM card    202

Fig. 2

Sending a paging message for paging the second SIM card to the second SIM card    201

Determining that the second SIM card has received the paging message but does not respond to the paging in response to receiving target indication information sent by the second SIM card    202

Not triggering a target operation    203

Fig. 3

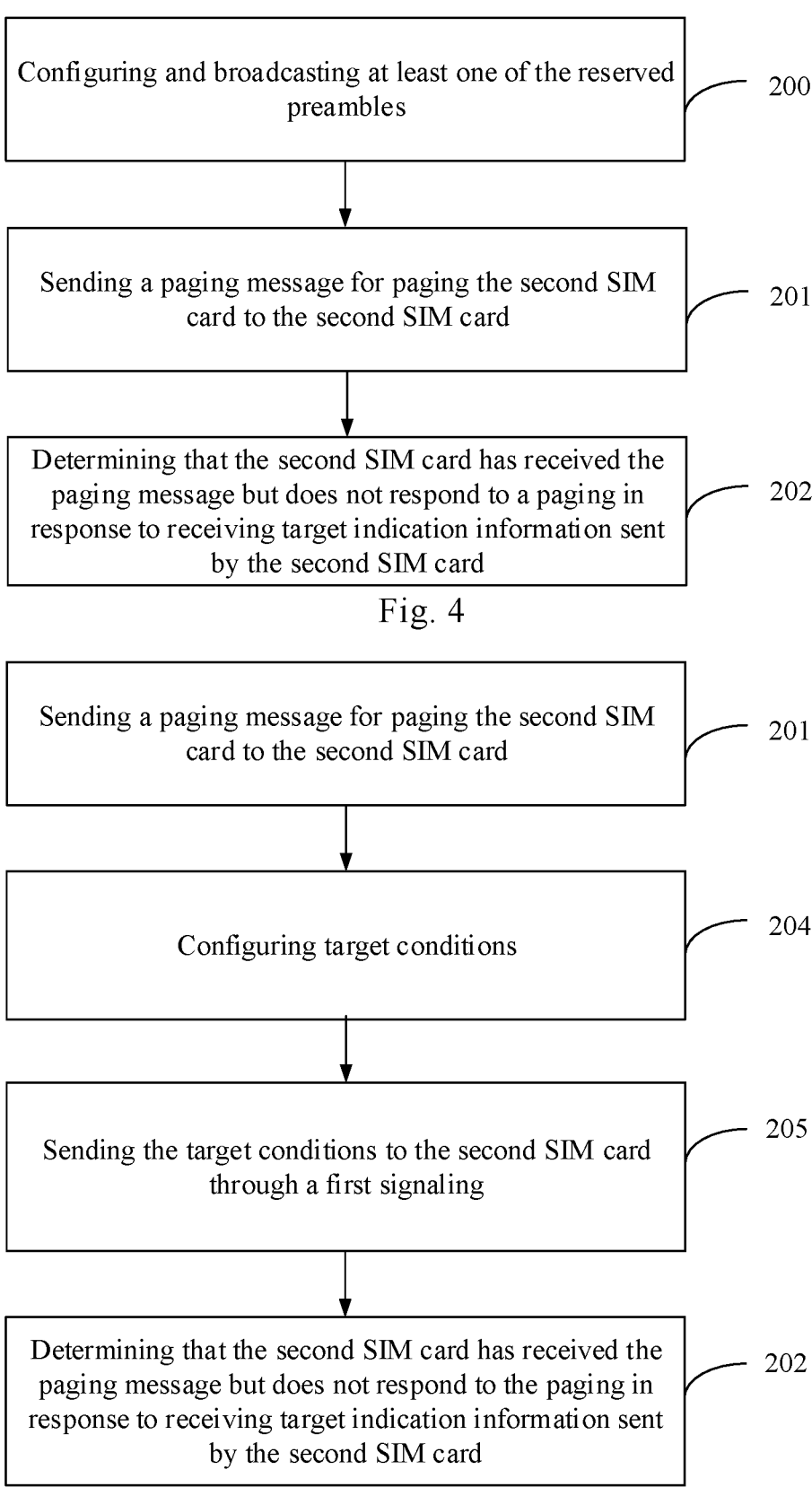

Configuring and broadcasting at least one of the reserved preambles 200

Sending a paging message for paging the second SIM card to the second SIM card 201

Determining that the second SIM card has received the paging message but does not respond to a paging in response to receiving target indication information sent by the second SIM card 202

Fig. 4

Sending a paging message for paging the second SIM card to the second SIM card 201

Configuring target conditions 204

Sending the target conditions to the second SIM card through a first signaling 205

Determining that the second SIM card has received the paging message but does not respond to the paging in response to receiving target indication information sent by the second SIM card 202

Fig. 5

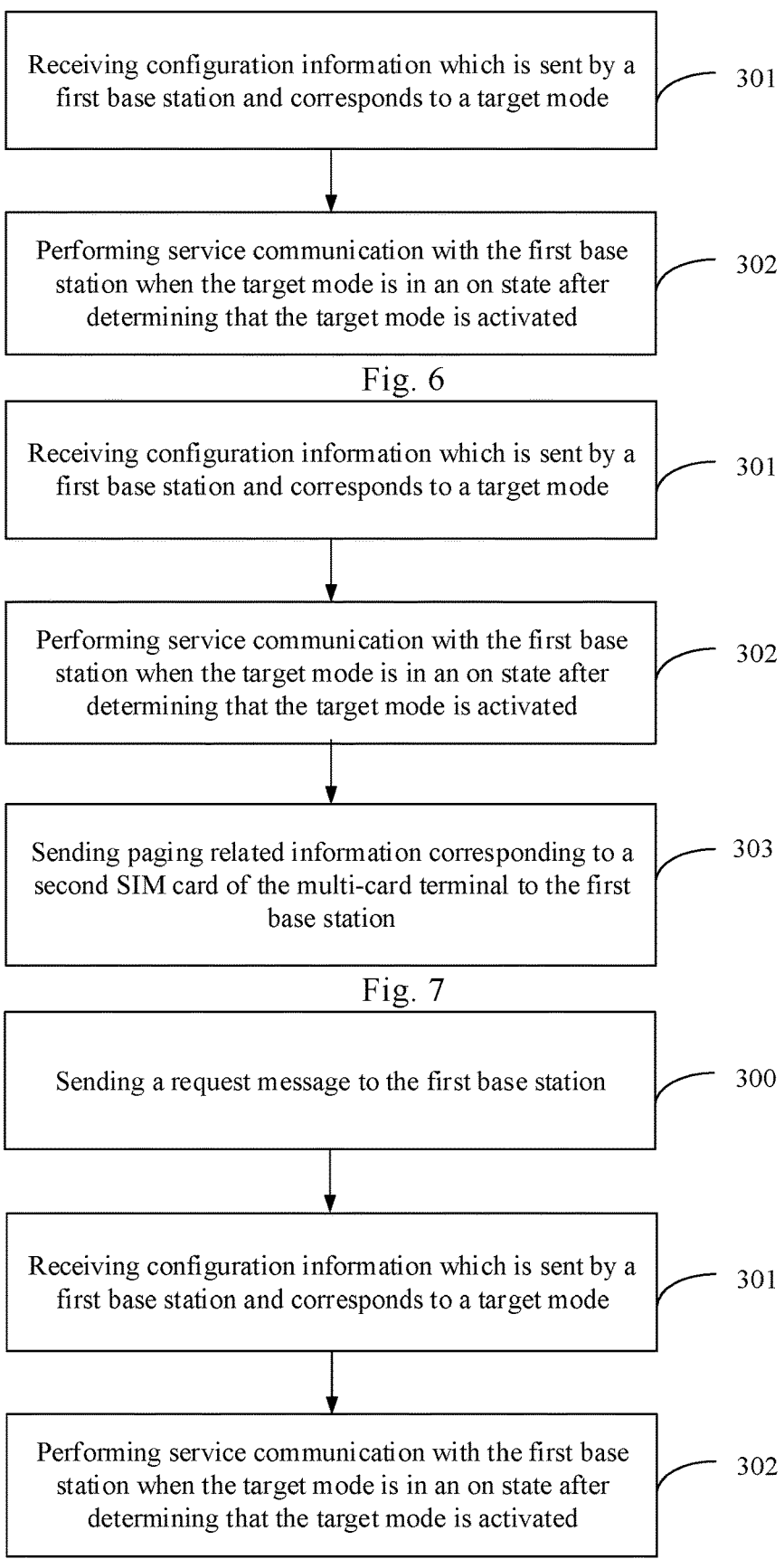

Receiving configuration information which is sent by a first base station and corresponds to a target mode ⟍ 301

Performing service communication with the first base station when the target mode is in an on state after determining that the target mode is activated ⟍ 302

Fig. 6

Receiving configuration information which is sent by a first base station and corresponds to a target mode ⟍ 301

Performing service communication with the first base station when the target mode is in an on state after determining that the target mode is activated ⟍ 302

Sending paging related information corresponding to a second SIM card of the multi-card terminal to the first base station ⟍ 303

Fig. 7

Sending a request message to the first base station ⟍ 300

Receiving configuration information which is sent by a first base station and corresponds to a target mode ⟍ 301

Performing service communication with the first base station when the target mode is in an on state after determining that the target mode is activated ⟍ 302

Fig. 8

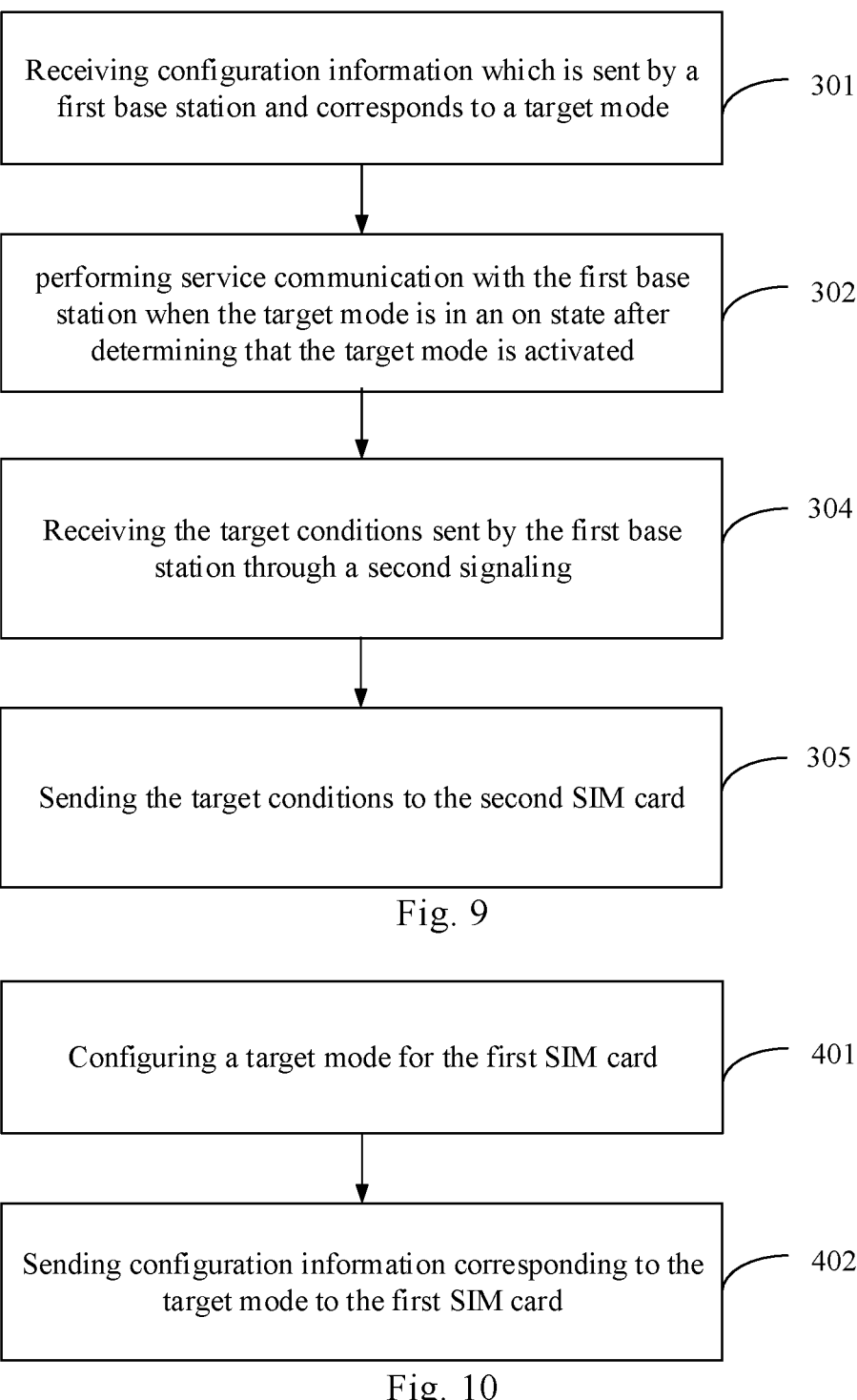

Receiving configuration information which is sent by a first base station and corresponds to a target mode — 301 performing service communication with the first base station when the target mode is in an on state after determining that the target mode is activated — 302

Receiving the target conditions sent by the first base station through a second signaling — 304

Sending the target conditions to the second SIM card — 305

Fig. 9

Configuring a target mode for the first SIM card — 401

Sending configuration information corresponding to the target mode to the first SIM card — 402

Fig. 10

Configuring a target mode for the first SIM card 401

Sending configuration information corresponding to the target mode to the first SIM card 402

Configure target conditions 403

Sending the target conditions to the first SIM card through a second signaling 404

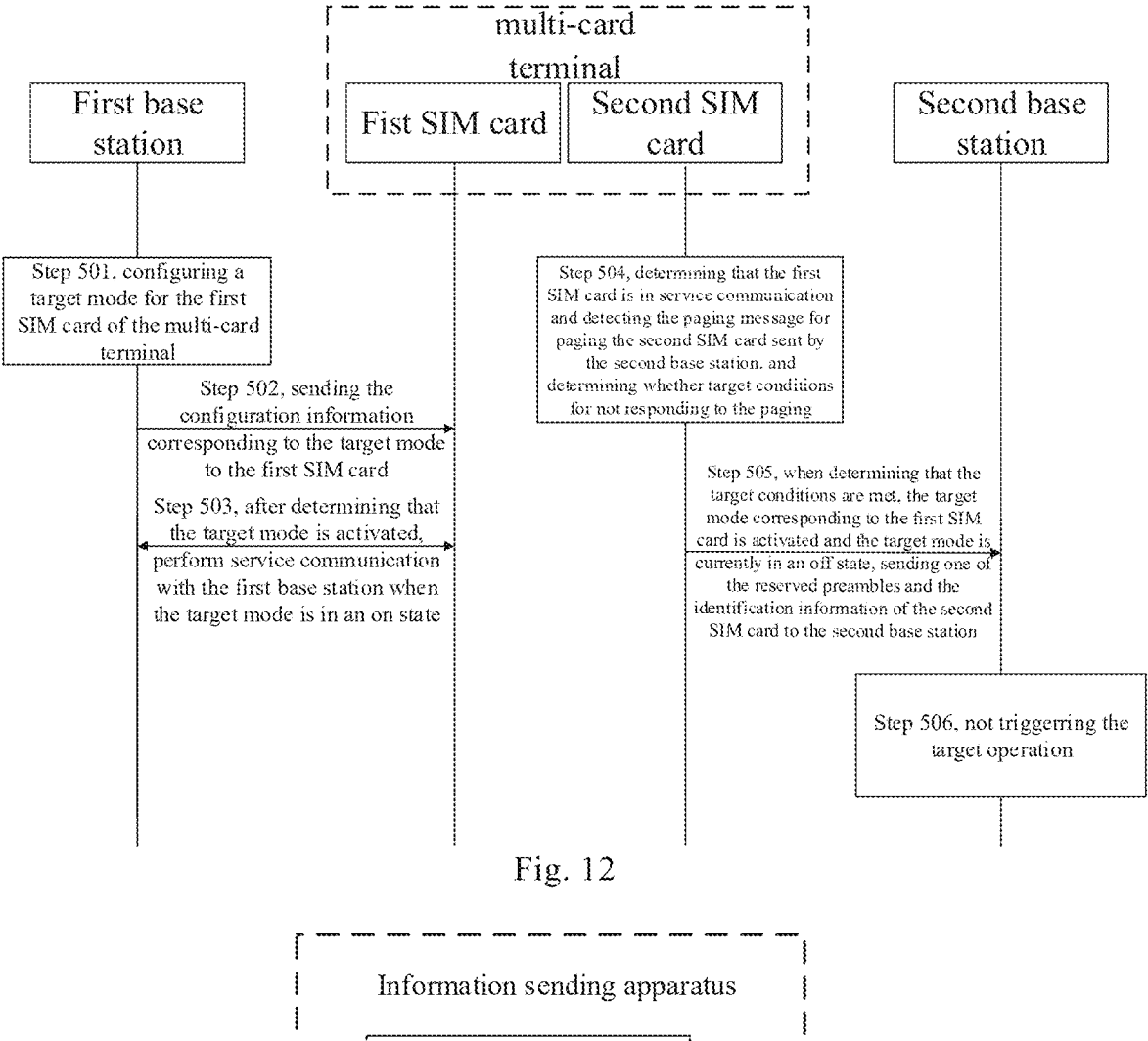

First base station multi-card terminal

Fist SIM card | Second SIM card

Second base station

Step 501, configuring a target mode for the first SIM card of the multi-card terminal Step 502, sending the configuration information corresponding to the target mode to the first SIM card Step 503, after determining that the target mode is activated, perform service communication with the first base station when the target mode is in an on state Step 504, determining that the first SIM card is in service communication and detecting the paging message for paging the second SIM card sent by the second base station, and determining whether target conditions for not responding to the paging Step 505, when determining that the target conditions are met, the target mode corresponding to the first SIM card is activated and the target mode is currently in an off state, sending one of the reserved preambles and the identification information of the second SIM card to the second base station Step 506, not triggering the target operation

Fig. 12

Information sending apparatus

First determining module ——610

First sending module ——620

Fig. 13

Information sending apparatus

Second sending module ⟋710

Second determining module ⟋720

Information sending apparatus

Receiving module ⟋810

Executing module ⟋820

Information sending apparatus

Configuring module ⟋910

Third sending module ⟋920

INFORMATION SENDING METHOD AND APPARATUS, AND STORAGE MEDIUM

CROSS-REFERENCE OF RELATED APPLICATION

The present application is a U.S. National Stage of International Application No. PCT/CN2020/122599, filed on Oct. 21, 2020, the contents of all of which are incorporated herein by reference in their entireties for all purposes.

TECHNICAL FIELD

The present disclosure relates to the field of communication, and in particular, to information sending method and apparatus, and a storage medium.

BACKGROUND

With the development of wireless communication technology, there are more and more multi-card terminals. At present, the processing methods for multi-card terminals are mainly based on the implementations of various terminal manufacturers, for example, dual card single standby, dual card dual standby single pass, dual card dual standby dual pass, and the like.

SUMMARY

Embodiments of the present disclosure provide method and information sending apparatus, and a storage medium.

According to a first aspect of the embodiments of the present disclosure, an information sending method is provided, wherein the method is performed by a second SIM card of a multi-card terminal, including: in response to determining that a first SIM card of the multi-card terminal is in service and detecting a paging message for paging the second SIM card that is sent by a second base station, determining whether to respond to the paging, where the second base station is a base station where the second SIM card resides; and sending target indication information to the second base station in response to determining not to respond to the paging; wherein the target indication information being used to inform the second base station that the second SIM card has received the paging message, but not to respond to a paging.

According to a second aspect of the embodiments of the present disclosure, an information sending method is provided, wherein the method is performed by a second base station, the second base station is a base station where a second SIM card of a multi-card terminal resides, including: sending a paging message for paging the second SIM card to the second SIM card; and determining that the second SIM card has received the paging message but does not respond to a paging in response to receiving target indication information sent by the second SIM card.

According to a third aspect of the embodiments of the present disclosure, an information sending method is provided, wherein the method is performed by a first SIM card of a multi-card terminal, including: receiving configuration information which is sent by a first base station and corresponds to a target mode; wherein the first base station is a base station accessed by the first SIM card; and determining, after the target mode is activated, to perform service communication with the first base station when the target mode is in an on state.

According to a fourth aspect of the embodiments of the present disclosure, an information sending method is provided, where the method is performed by a first base station, the first base station is a base station accessed by the first SIM card of a multi-card terminal, including: configuring a target mode for the first SIM card; wherein the target mode is used to indicate a state mode in which the first SIM card performs service communication with the first base station; and sending configuration information corresponding to the target mode to the first SIM card.

According to a fifth aspect of the embodiments of the present disclosure, an information sending apparatus is provided, where the apparatus is used for a second SIM card of a multi-card terminal, including: a first determining module, configured to, in response to determining that a first SIM card of the multi-card terminal is in service and detecting a paging message for paging the second SIM card that is sent by a second base station, determine whether to respond to the paging, wherein the second base station is a base station where the second SIM card resides; and a first sending module, configured to send target indication information to the second base station in response to determining not to respond to the paging; wherein the target indication information being used to inform the second base station that the second SIM card has received the paging message, but does not respond to a paging.

According to a sixth aspect of the embodiments of the present disclosure, an information sending apparatus is provided, wherein the apparatus is used for a second base station, the second base station is a base station where a second SIM card of a multi-card terminal resides, including: a second sending module, configured to send a paging message for paging the second SIM card to the second SIM card; and a second determining module, configured to determine that the second SIM card has received the paging message but does not respond to a paging in response to receiving target indication information sent by the second SIM card.

According to a seventh aspect of the embodiments of the present disclosure, an information sending apparatus is provided, wherein the apparatus is used for a first SIM card of a multi-card terminal, including: a receiving module, configured to receive configuration information which is sent by a first base station and corresponds to a target mode; where the first base station is a base station accessed by the first SIM card; and a executing module, configured to perform service communication with the first base station when the target mode is in an on state after determining that the target mode is activated.

According to an eighth aspect of the embodiments of the present disclosure, an information sending apparatus is provided, wherein the apparatus is used for a first base station, the first base station is a base station accessed by the first SIM card of a multi-card terminal, including: a configuring module, configured to configure a target mode for the first SIM card; wherein the target mode is used to indicate a state mode in which the first SIM card performs service communication with the first base station; and a third sending module, configured to send configuration information corresponding to the target mode to the first SIM card.

According to a ninth aspect of the embodiments of the present disclosure, a computer-readable storage medium is provided, the storage medium stores a computer program for executing the information sending method of any one of the first or third aspects.

According to a tenth aspect of the embodiments of the present disclosure, a computer-readable storage medium is provided, the storage medium stores a computer program for executing the information sending method of any one of the second or fourth aspects.

According to an eleventh aspect of the embodiments of the present disclosure, an information sending apparatus is provided, including: a processor; and a memory for storing an instruction executable by the processor; wherein the processor is configured to execute the information sending method of any one of the first or third aspects.

According to a twelfth aspect of the embodiments of the present disclosure, an information sending apparatus is provided, including: a processor; and a memory for storing an instruction executable by the processor; wherein the processor is configured to execute the information sending method of any one of the second or fourth aspects.

It is to be understood that both the foregoing general description and the following detailed description are exemplary and explanatory only and are not restrictive of the present disclosure.

BRIEF DESCRIPTION OF THE DRAWINGS

The accompanying drawings here, which are incorporated in and constitute a part of this specification, illustrate embodiments consistent with the present disclosure and, together with the specification, serve to explain the principles of the present disclosure.

FIG. 1 is a schematic flowchart of information sending method according to an embodiment.

FIG. 2 is a schematic flowchart of another information sending method according to an embodiment.

FIG. 3 is a schematic flowchart of another information sending method according to an embodiment.

FIG. 4 is a schematic flowchart of another information sending method according to an embodiment.

FIG. 5 is a schematic flowchart of another information sending method according to an embodiment.

FIG. 6 is a schematic flowchart of another information sending method according to an embodiment.

FIG. 7 is a schematic flowchart of another information sending method according to an embodiment.

FIG. 8 is a schematic flowchart of another information sending method according to an embodiment.

FIG. 9 is a schematic flowchart of another information sending method according to an embodiment.

FIG. 10 is a schematic flowchart of another information sending method according to an embodiment.

FIG. 12 is a schematic flowchart of another information sending method according to an embodiment.

FIG. 13 is a block diagram of information sending apparatus according to an embodiment.

FIG. 18 is a schematic structural diagram of another information sending apparatus according to an embodiment of the present disclosure.

DETAILED DESCRIPTION

Figure 11:
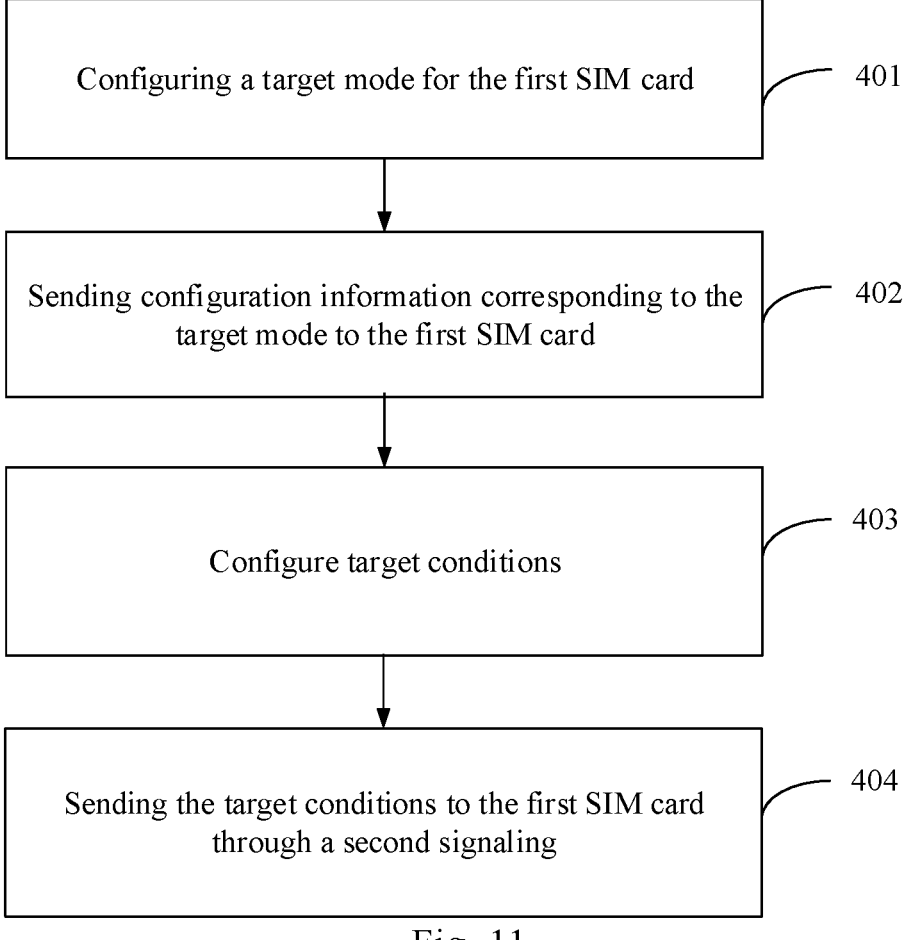
FIG. 11 is a schematic flowchart of another information sending method according to an embodiment.

Here, a detailed explanation will be given to embodiments, examples of which are illustrated in the accompanying drawings. When the following description involves the accompanying drawings, unless otherwise indicated, the same reference numbers in different drawings represent the same or similar elements. The implementations described in the following embodiments do not represent all implementations consistent with the present disclosure. Instead, they are merely examples of apparatuses and methods consistent with certain aspects of the present disclosure, as detailed in the appended claims.

Terms used in the present disclosure are only for the purpose of describing specific embodiments and not intended to limit the present disclosure. "A", "an", "said", and "the" in a singular form in the present disclosure and the appended claims are intended to include a plural form as well, unless the context clearly indicated otherwise. It should also be understood that term "and/or" as used herein refers to and encompasses any and all possible combinations of one or more of the associated listed items.

It should be understood that, although the terms first, second, third and the like may be adopted to describe various information in the present disclosure, such information should not be limited to these terms. For example, without departing from the scope of the present disclosure, first information may also be referred to as second information, and similarly, second information may also be referred to as first information. The word "if" used here may be explained as "while" or "when" or "in response to determining that", which depends on the context.

When a multi-card terminal communicates with a first system via a certain SIM card, it needs to monitor a second system from time to time, for example, listen for paging, take measurements, read system messages, and the like. This may affect the performance of the first system. If these operations are performed for the second system, for example, if listening for paging is not performed, it may cause that the service for the second system cannot be established.

When the multi-card terminal receives a paging message on the second system, it also needs to decide whether it needs to respond to the paging, which is not specified in the current standard and is generally performed based on the rules configured by the user. If the multi-card terminal does not respond to the paging message of the second system, the second system will keep paging the terminal until the maximum number of times is reached. On the one hand, signaling resources are wasted, and on the other hand, error statistics or operations of the second system may be triggered.

Below, information sending method provided by the present disclosure is described from the second SIM card side of the multi-card terminal. The multi-card terminal refers to a terminal supporting installation of two or more SIM (Subscriber Identity Module) cards, and the second SIM card refers to any one of the SIM cards in an idle state on the multi-card terminal.

An embodiment of the present disclosure provides information sending method. Referring to FIG. 1. FIG. 1 is a flowchart of information sending method according to an embodiment, and the method may be used for a second SIM card of a multi-card terminal. The method may include the following steps: at step 101, in response to determining that the first SIM card of the multi-card terminal is in service and a paging message for paging the second SIM card sent by a second base station is detected, determining whether to respond to the paging.

In the embodiments of the present disclosure, the first SIM card is an SIM card in service, and while the first SIM card is in service, the second SIM card may monitor its corresponding second system. The second system may refer to a second base station where the second SIM card resides, or may refer to an operator system corresponding to the second SIM card, which is not limited in the present disclosure. The second system may be the same as or different from the first system, and the first system refers to a system corresponding to the first SIM card.

In the embodiments of the present disclosure, the second SIM card detects the paging message for paging the second SIM card sent by the second base station, and it may be determined by the second SIM card whether to respond to the paging.

At step 102, target indication information is sent to the second base station in response to determining not to respond to the paging.

In the embodiments of the present disclosure, the target indication information is used to inform the second base station that the second SIM card has received the paging message, but does not respond to the paging.

In the above embodiments, the second SIM card of the multi-card terminal may inform the second base station that it has received the paging message but does not respond to the paging under the condition that the first SIM card is in service and a paging message for paging the second SIM card is detected, so as to avoid triggering a wrong operation or statistical analysis of the second base station, and can avoid wasting signaling resources caused by the second base station repeatedly paging the second SIM card when the paging response is not received.

In an embodiment, for the above step 102, the second SIM card may determine not to respond to the paging if a target condition of not responding to the paging is met.

In some examples, the target condition includes any one of the following: the service priority of a first service corresponding to the paging message is lower than the service priority of a second service currently performed by the first SIM card; or responding to the paging affects service quality of the second service currently performed by the first SIM card.

For example, the service priority corresponding to the first service to be performed by the paging message is priority 2, the service priority corresponding to the second service currently performed by the first SIM card is priority 1, and priority 1 is greater than priority 2, so the second SIM card may determine not to respond to the paging at this time.

For another example, if the second SIM card responds to the paging, which may affect the QoS (Quality of Service) of the second service currently performed by the first SIM card, assuming that the game performed by the first SIM card may be interrupted, then the second SIM card determines not to respond to the paging.

In one example, if the service priority of the first service corresponding to the paging message is higher than the service priority of the second service currently performed by the first SIM card, or responding to the paging may not affect service quality of the second service currently performed by the first SIM card, the second SIM card determines to respond to the paging.

For example, the first SIM card performs a video playback service, some un-played content has been cached on the multi-card terminal at present, and even if the second SIM card responds to the paging, it will not affect the video to continue to be played, so the second SIM card determines to respond to the paging.

For another example, the first SIM card performs a web page loading service, if all or main contents of a page have been loaded, and the overall page display is not affected, then the second SIM card determines to respond to the paging.

In the above embodiments, if it is determined that the service of the first SIM card may be affected, the second SIM card may not respond to the paging, so that the service quality of the first SIM card is ensured, which has high usability. In an embodiment, the second SIM card may determine the target condition in any one of the following ways:

in a first way, the target condition is configured by the second base station and sent to the second SIM card through a first signaling.

The first signaling includes, but is not limited to, NAS (Non Access Stratum) signaling or RRC (Radio Resource Control) signaling.

In a second way, the target condition may be sent by the first SIM card to the second SIM card.

In this way, the target condition may be configured by the first base station, and after the first base station informs the first SIM card of the target condition through a second signaling, the first SIM card may send the target condition to the second SIM card. The second signaling may include, but is not limited to, a NAS signaling or an RRC signaling.

In a third way, the target condition is determined according to the configuration of the multi-card terminal.

In this way, the user may make settings on the multi-card terminal, including, but not limited to, setting different service priorities. Or, the user may also directly set that when a certain service is performed through any SIM card, other SIM cards are not allowed to respond to paging, and the like.

The second SIM card may determine the corresponding target condition according to the above configuration information of the multi-card terminal.

In the above embodiments, the second SIM card may determine the target condition in various ways, so as to determine whether to respond to the paging according to the target condition, which has high usability.

In an embodiment, target indication information may be one of reserved preambles.

In the embodiments of the present disclosure, the reserved preambles may be configured by the second base station, and at least one of the configured reserved preambles may be only used as the target indication information and is not used to perform random access.

In addition, the second SIM card may also send its own identification information to the second base station while sending the target indication information, so that the second base station determines which SIM card has received the paging message, but does not respond to the paging.

In an embodiment, the target indication information may be a target message capable of carrying an RRC signaling. In one example, the target message may include message 3 in a four-step random access process. In another example, the target message may include message A in a two-step random access process.

In the embodiments of the present disclosure, the RRC signaling carried by the target message may include, but is not limited to, RRC ConnectionRequest (RRC connection request) signaling or RRCSetupRequest (RRC establishment request) signaling carried in message 3.

In the embodiments of the present disclosure, the reason indication information for not responding to the paging may be carried in a specific information unit of the RRC signaling carried by the target message. The specified information unit includes, but is not limited to, EstablishmentCause (establishment reason) information unit.

The above reason indication information may indicate a specific reason why the second SIM card does not respond to the paging, including, but not limited to, the first SIM card is in service or currently performing a service with a higher service priority. Or the reason indication information may not indicate a specific reason and directly indicate a busy state.

In one example, different bit values or enumerated character strings may be corresponding to different reasons for not responding to a paging respectively, and a correspondence relationship between the bit values or enumerated character strings and the reasons for not responding to the paging may be preconfigured by a protocol or dynamically configured by the second base station, which is not limited by the disclosure.

In the above embodiments, the second SIM card may use one of the reserved preambles as the target indication information, or may use target message capable of carrying an RRC signaling as the target indication information, so as to inform the second base station that the second SIM card has received the paging message, but does not responding to the paging, which is simple and convenient to implement and has high usability.

In an embodiment, in order not to affect the ongoing service of the first SIM card, the target indication information may be sent to the second base station in the case that it is determined that the target mode corresponding to the first SIM card is activated and the target mode is currently in the off state.

The target mode may be a pattern (mode) or configuration configured for the first SIM card by the first base station previously accessed by the first SIM card, and the target mode may be used to indicate a state mode of the first SIM card performing service communication with the first base station. In some examples, the target mode may include two states of on and off. After receiving configuration information of the target mode configured by the first base station, the multi-card terminal side needs to activate the target mode first to ensure that the target mode may be used. Further, the target mode may be switched between two states of on and off. When the target mode is activated and in an on state, the first SIM card performs service communication with the first base station. When the target mode is activated, but the target mode is in an off state, the first SIM card suspends the service communication with the first base station, and at this time, the second SIM card can be enabled to send target indication information to the second base station, in order to avoid any impact on the service of the first SIM card.

In one example, when the target mode is activated and the target mode is in an on state, the first SIM card performs service communication with the first base station, and when the target mode is activated but the target mode is in the off state, the first SIM card does not perform service communication with the first base station.

In the above embodiments, in the case that the target mode corresponding to the first SIM card is activated and the target mode is currently in the off state, the second SIM card sends the target indication information to the second base station, which can avoid impact on the ongoing service of the first SIM card and has high usability.

Below, the information sending method provided by the present disclosure is described from a second base station side. The second base station is a base station where the second SIM card of the multi-card terminal resides.

An embodiment of the present disclosure provides another information sending method, referring to FIG. 2. FIG. 2 is a flowchart of information sending method according to an embodiment, and the method may be used for the second base station. The method may include the following steps: at step 201, sending a paging message for paging the second SIM card to the second SIM card; at step 202, determining that the second SIM card has received the paging message but does not respond to the paging in response to receiving target indication information sent by the second SIM card.

In the above embodiments, according to the received target indication information, the second base station may determine that the second SIM card has received the paging message but does not respond to a paging, and can subsequently avoid performing a wrong statistical analysis or operation, which has high usability.

In an embodiment, referring to FIG. 3, FIG. 3 is a flowchart of another information sending method according to the embodiment shown in FIG. 2, and after step 202, the above method may further include: at step 203, not triggering a target operation.

In the embodiments of the present disclosure, not triggering the first operation may refer to not triggering the operation of determining that the second SIM card is in an off state, and/or not triggering the operation of determining that a tracking area where the second SIM card is located has changed, and/or not triggering the operation of paging the second SIM card again within the target duration.

The target duration may be configured or randomly selected by the second base station, which is not limited in the present disclosure. In one example, the target duration should exceed a timing duration of a preset timer, wherein the preset timer is a timer started by the second base station after sending the paging message to the second SIM card, and if the second base station does not receive a paging response at the end of the timer, the second base station will page the second SIM card again until the number of paging times for paging the second SIM card reaches a preset number of times.

In the above embodiments, it can avoid triggering incorrect operations or statistics by the second base station, and also avoid wasting signaling resources caused by frequent paging of the second SIM card.

In an embodiment, the target indication information may be one of reserved preambles or may be target message capable of carrying an RRC signaling. In one example, the target message may include a message 3 in a four-step random access process. In another example, the target message may include a message A in a two-step random access process.

If the target indication information includes one of the reserved preambles, referring to FIG. 4, FIG. 4 is a flowchart of another information sending method according to the embodiment shown in FIG. 2, and the above method may further include: at step 200, configuring and broadcasting at least one of the reserved preambles.

In the embodiments of the present disclosure, the at least one reserved preamble may be configured by the second base station. The reserved preamble may be used only to indicate that the corresponding SIM card has received the paging message, but does not respond to a paging. Any SIM card cannot use the reserved preamble for random access.

Further, the second base station may broadcast the at least one configured reserved preamble by the system message, so that the second SIM card uses one of the reserved preambles as the target indication information, to inform the second base station that the second SIM card has received the paging message but does not respond to a paging.

In the above embodiments, the second base station may configure and broadcast the reserved preamble, so that it is determined that the second SIM card has received the paging message according to one of the reserved preambles sent by the second SIM card subsequently, but does not respond to a paging, which can avoid the second base station performing a wrong statistical analysis or operation, and can avoid wasting signaling resources caused by repeatedly paging the second SIM card.

In an embodiment, referring to FIG. 5, FIG. 5 is a flowchart of another information sending method according to the embodiment shown in FIG. 2, and the above method may further include: at step 204, configuring target condition.

The target condition is a condition under which the second SIM card determines not to respond to a paging in the case that the first SIM card is in service and the paging message for paging the second SIM card that is sent by the second base station is detected. In other words, in response to that the target condition is met, the second SIM card determines not to respond to a paging in the case that the first SIM card is in service and the paging message for paging the second SIM card that is sent by the second base station is detected. The target condition includes, but is not limited to, that the number of times of the second SIM card continuously receiving the paging signaling sent by the second base station reaches or exceeds a preset number of times.

At step 205, the target condition is sent to the second SIM card through a first signaling.

The first signaling includes, but is not limited to, a NAS signaling or an RRC signaling.

In the above embodiments, the second base station may configure the target condition, and inform the second SIM card of the target condition through the first signaling. In the case that the second SIM card determines that the target condition is met, the second SIM card does not respond to a paging, which is simple and convenient to implement and has high usability.

Below, the information sending scheme provided by the embodiments of the present disclosure is described from the first SIM card side. The first SIM card is the SIM card of the multi-card terminal which is in service.

Referring to FIG. 6, the embodiments of the present disclosure provide another information sending method. FIG. 6 is a flowchart of an information sending method according to an embodiment, and the method may be used for a first SIM card. The method may include the following steps: at step 301, receiving configuration information which is sent by a first base station and corresponds to a target mode.

The first base station is a base station accessed by the first SIM card. The target mode is a pattern or configuration configured for the first SIM card of the multi-card terminal by the first base station, and may be used to indicate a state mode of the first SIM card performing service communication with the first base station. In some examples, the target mode may include two states of on and off. The target mode needs to be activated first, and then switched between the on and off states. When the target mode is activated and in an on state, the first SIM card performs service communication with the first base station. When the target mode is activated but the target mode is in an off state, the first SIM card suspends the service communication with the first base station, and at this time, the multi-card terminal may enable the second SIM card to send target indication information to the second base station, in order to avoid impact on the service of the first SIM card.

At step 302, after determining that the target mode is activated, service communication with the first base station is performed when the target mode is in an on state.

In the embodiments of the present disclosure, the first SIM card needs to perform service communication with the first base station when the target mode is in an on state after the target mode is activated. If the target mode is activated but the target mode is in an off state, the first SIM card may stop service communication with the first base station, and at this time, the target indication information may be sent by the second SIM card to the second base station.

In the above embodiments, when the target indication is sent to the second base station by the second SIM card, it can avoid impact on the ongoing service of the first SIM card, which has high usability.

In an embodiment, for the above step 301, the first base station may directly configure the target mode for the first SIM card, and send configuration information corresponding to the target mode to the first SIM card, which has high usability.

Accordingly, referring to FIG. 7, FIG. 7 is a flowchart illustrating another information sending method according to the embodiment shown in FIG. 6. The above method may further include: at step 303, sending paging related information corresponding to a second SIM card of the multi-card terminal to the first base station.

In the embodiments of the present disclosure, the execution sequence of step 303 and steps 301 and 302 is not limited. The second SIM card may inform the first SIM card of the paging related information corresponding to the second SIM card through the multi-card terminal, and the first SIM card send it to the first base station, so that the first base station may configure a target mode by combining the paging related information of the second SIM card. In some examples, the paging related information may include paging occasion related information.

In the above embodiments, the first SIM card may separately send the paging related information corresponding to the second SIM card to the first base station, which facilitates the subsequent configuration of the target mode by the first base station, and is simple and convenient to implement and has high usability.

In an embodiment, for the above step 301, the first SIM card may request the first base station to configure the target mode, and the first base station configures the target mode based on the request of the first SIM card. Referring to FIG. 8, FIG. 8 is a flowchart illustrating another information sending method according to the embodiment shown in FIG. 5. The above method may further include: at step 300, sending a request message to the first base station.

The request message is used for requesting the first base station to configure the target mode for the first SIM card. In some examples, the paging related information corresponding to the second SIM card of the multi-card terminal may be carried in the request message.

Accordingly, step 301 may include: receiving the configuration information configured for the first SIM card by the first base station based on the request message and corresponding to the target mode. The first base station may configure the target mode in combination with the paging related information corresponding to the second SIM card carried in auxiliary information of the request message. Certainly, the first base station may also configure the target mode according to the service information of the first SIM card, which is not limited in the present disclosure.

In the above embodiments, the first SIM card may request the first base station to configure the target mode, and the first base station performs target mode configuration and transmission based on the request message, which has high usability.

In an embodiment, the first SIM card may activate the target configuration in any of the following ways.

In a first way, the configuration information corresponding to the target mode sent by the first base station is received, and the target mode is immediately activated.

In a second way, determining when the target mode is activated based on the activation condition configured by the first base station.

In this way, the activation condition may include, but is not limited to, that the number of times of the second SIM card continuously receiving the paging message sent by the second base station reaches or exceeds a preset number of times. The target configuration may be activated in the case that the first SIM card determines the number of times of the paging message received by the second SIM card has reached or exceeded a preset number of times.

In a third way, after receiving activation indication information sent by a second SIM card of the multi-card terminal, the target mode is activated.

In this way, the second SIM card may determine whether the activation condition for activating the target configuration is met. For example, the second SIM card determines that the number of times of continuously receiving the paging message sent by the second base station reaches or exceeds a preset number of times, and determines that the activation condition is met. The second SIM card sends the above activation indication information to the first SIM card, and the first SIM card activates the target mode according to the activation indication information.

In the above embodiments, the first SIM card may activate the target mode according to any of the above ways, and subsequently may perform service communication with the first base station when the target mode is in an on state, so as to avoid impact on the service of the first SIM card when the second SIM card sends the target indication information to the second base station, which has high usability.

In an embodiment, for the above second and third ways for activating the target mode, the first SIM card also needs to send a notification message to the first base station. The notification message is used to inform the first base station that the target mode is activated. Subsequently, the first SIM card performs service communication with the first base station when the target mode is in the on state.

In the above embodiments, if the first SIM card does not immediately activate the target mode after receiving the configuration information corresponding to the target mode, the first SIM card may inform the first base station after activating the target mode, which is simple and convenient to implement and has high usability.

In an embodiment, referring to FIG. 9, FIG. 9 is a flowchart illustrating another information sending method according to the embodiment shown in FIG. 5. The above method may further include: at step 304, receiving the target condition sent by the first base station through a second signaling.

The second signaling includes, but is not limited to, a NAS signaling or an RRC signaling. The target condition is a condition under which the second SIM card determines not to respond to a paging in the case that the first SIM card is in service and a paging message for paging the second SIM card that is sent by the second base station is detected. In other words, in response to that the target condition is met, the second SIM card determines not to respond to a paging in the case that the first SIM card is in service and a paging message for paging the second SIM card that is sent by the second base station is detected.

In some examples, the target condition may include any one of the following: the service priority of a first service corresponding to the paging message is lower than the service priority of a second service currently performed by the first SIM card; or responding to a paging affects service quality the second service currently performed by the first SIM card.

At step 305, the target condition is sent to the second SIM card.

In the embodiments of the present disclosure, after the first base station configures the target condition and sends the target condition to the first SIM card through the second signaling, the first SIM card may forward the target condition to the second SIM card, so that the second SIM card determines whether to respond to a paging.

In the above embodiments, the first base station may configure the target condition and send the target condition to the first SIM card through the second signaling, and the first SIM card sends the target condition to the second SIM card after receiving the target condition, which is simple and convenient to implement and has high usability.

Below, the information sending scheme provided by the embodiments of the present disclosure is described from a first base station side. The first base station is a base station to which the first SIM card of the multi-card terminal is accessed.

An embodiment of the present disclosure provides another information sending method, referring to FIG. 10. FIG. 10 is a flowchart of an information sending method according to an embodiment, and the method may be used for the first base station. The method may include the following step: at step 401, configuring a target mode for the first SIM card.

The target mode is a pattern or configuration configured for the first SIM card by the first base station, and is used to indicate a state mode of the first SIM card performing service communication with the first base station. In some examples, the target mode may include two states of on and off. After receiving configuration information of the target mode configured by the first base station, the multi-card terminal side needs to activate the target mode first to ensure that the target mode may be used. Further, the target mode may be switched between two states of on and off. When the target mode is activated and in an on state, the first SIM card performs service communication with the first base station, and when the target mode is activated, but the target mode is in an off state, the first SIM card suspends the service communication with the first base station, and at this time, the second SIM card can be enabled to send target indication information to the second base station, in order to avoid impact on the service of the first SIM card.

At step 402, configuration information corresponding to the target mode is sent to the first SIM card.

In the above embodiments, after the first base station sends the configuration information corresponding to the target mode to the first SIM card, the first SIM card may perform service communication with the first base station under the condition that the target mode is activated and the target mode is in the on state, so as to avoid impact on the service of the first SIM card when the second SIM card sends the target indication information to the second base station.

In an embodiment, for step 401, the first base station may automatically configure the target mode for the first SIM card. In this way, the paging related information corresponding to the second SIM card sent by the first SIM card may be separately received, so as to configure the target mode subsequently.

Alternatively, the first base station may configure a target mode for the first SIM card according to the request message sent by the first SIM card, wherein the request message is used for requesting the first base station to configure the target mode for the first SIM card. In this way, the request message may carry paging related information corresponding to the second SIM card, and the target mode is configured subsequently according to the paging related information corresponding to the second SIM card carried by the auxiliary information in the request message.

In some examples, the above paging related information includes, but is not limited to, paging occasion related information.

In the above embodiments, the first base station may configure the target mode automatically or based on a request of the first SIM card, which has high usability.

In one example, the first base station may configure the target mode for the first SIM card according to the paging related information corresponding to the second SIM card of the multi-card terminal.

Taking the example that the paging information includes paging occasion related information, and the paging occasion corresponding to the second SIM card includes time point 1, time point 3, and time point 5 . . . , then the configuration information corresponding to the target mode configured by the first base station may include: the first SIM card is in an on state of the target mode at time point 2, time point 4, and the like, and in an off state of the target mode at time point 1, time point 3, time point 5, and the like.

In another example, the first base station may configure the target mode for the first SIM card according to service information of the first SIM card.

For example, in a service period, the first SIM card may perform a current service from the m-th to n-th milliseconds, and the configuration information corresponding to the target mode configured by the first base station may include: the first SIM card is in the on state of the target mode from the m-th to n-th milliseconds, and is in the off state of the target mode at other time of the period.

In the above embodiments, the first base station may configure the target mode for the first SIM card, which is simple and convenient to implement and has high usability.

In an embodiment, referring to FIG. 11, FIG. 11 is a flowchart illustrating another information sending method according to the embodiment shown in FIG. 10. The above method may further include: at step 403, configuring target condition.

The target condition is a condition under which the second SIM card determines not to respond to a paging in the case that the first SIM card is in service and the paging message for paging the second SIM card that is sent by the second base is detected. In other words, in response to that the target condition is met, the second SIM card determines not to respond to a paging in the case that the first SIM card is in service and the paging message for paging the second SIM card that is sent by the second base is detected.

The target condition includes any one of the following: the service priority of a first service corresponding to the paging message is lower than the service priority of a second service currently performed by the first SIM card; or responding to a paging affects service quality of the second service currently performed by the first SIM card.

At step 404, the target condition is sent to the first SIM card through a second signaling.

In the above embodiments, the second signaling includes, but is not limited to, a NAS signaling or an RRC signaling, which has high usability.

In an embodiment, referring to FIG. 12, FIG. 12 is a flowchart of an information sending method according to an embodiment. The method may include: at step 501, the first base station configures a target mode for the first SIM card of the multi-card terminal.

The target mode is used to indicate a state mode in which the first SIM card performs service communication with the first base station. The first base station may configure the target mode according to the request message sent by the multi-card terminal, or the first base station directly configures the target mode. Specifically, the first base station may configure the target mode according to paging related information corresponding to the second SIM card, and/or may configure the target mode according to service information of the first SIM card.

At step 502, the first base station sends the configuration information corresponding to the target mode to the first SIM card.

At step 503, after determining that the target mode is activated, the first SIM card performs service communication with the first base station when the target mode is in an on state.

The first SIM card may activate the target mode immediately after receiving the configuration information corresponding to the target mode, or may determine when to activate the target mode according to the activation condition sent by the first base station, or may also determine to activate the target mode according to the activation indication information sent by the second SIM card.

At step 504, the multi-card terminal determines through the second SIM card, that the first SIM card is in service and the paging message for paging the second SIM card sent by the second base station is detected, and determines whether target condition for not responding to a paging is met.

The target condition includes any one of the following: the service priority of a first service corresponding to the paging message is lower than the service priority of a second service currently performed by the first SIM card; or responding to the paging affects service quality of the second service currently performed by the first SIM card.

At step 505, when the second SIM card of the multi-card terminal determines that the target condition is met, the target mode corresponding to the first SIM card is activated and the target mode is currently in an off state, one of the reserved preambles and the identification information of the second SIM card are sent to the second base station.

Alternatively, step 505 may be replaced by step 505' (not shown in FIG. 12), and when the second SIM card of the multi-card terminal determines that the target condition is met, the target mode corresponding to the first SIM card is activated and the target mode is currently in the off state, the target message capable of carrying an RRC signaling is sent to the second base station.

The target message include a message 3 in a four-step random access process. The specified information unit included in the RRC signaling carried by the target message carries reason indication information for not responding to a paging.

At step 506, the second base station does not trigger the target operation.

Not triggering the target operation includes at least one of the following: not triggering the operation of determining that the second SIM card is in an off state; not triggering the operation of determining that a tracking area where the second SIM card is located has changed; and not triggering the operation of re-paging the second SIM card within the target duration.

In the above embodiments, the second SIM card may inform the second base station that the second SIM card has received the paging message, but does not respond to the paging under the condition that the first SIM card is in service and the paging message for paging the second SIM card that is sent by the second base station is detected, which can avoid triggering a wrong operation or statistical analysis of the second base station, and can avoid wasting signaling resources caused by the second base station repeatedly paging a second SIM card when a paging response is not received.

Corresponding to the embodiments of the aforementioned method implemented by application functions, the present disclosure further provides embodiments of apparatus implemented by application functions.

Referring to FIG. 13, FIG. 13 is a block diagram of information sending apparatus according to an embodiment, and the apparatus is used for the second SIM card of the multi-card terminal, including: a first determining module 610, configured to, in response to determining that the first SIM card of the multi-card terminal is in service and a paging message for paging the second SIM card that is sent by the second base station is detected, determine whether to respond to a paging, wherein the second base station is a base station where the second SIM card resides; and a first sending module 620, configured to send target indication information to the second base station in response to determining not to respond to a paging; wherein the target indication information being used to inform the second base station that the second SIM card has received the paging message, but does not respond to a paging.

Figures 14, 15, 16:
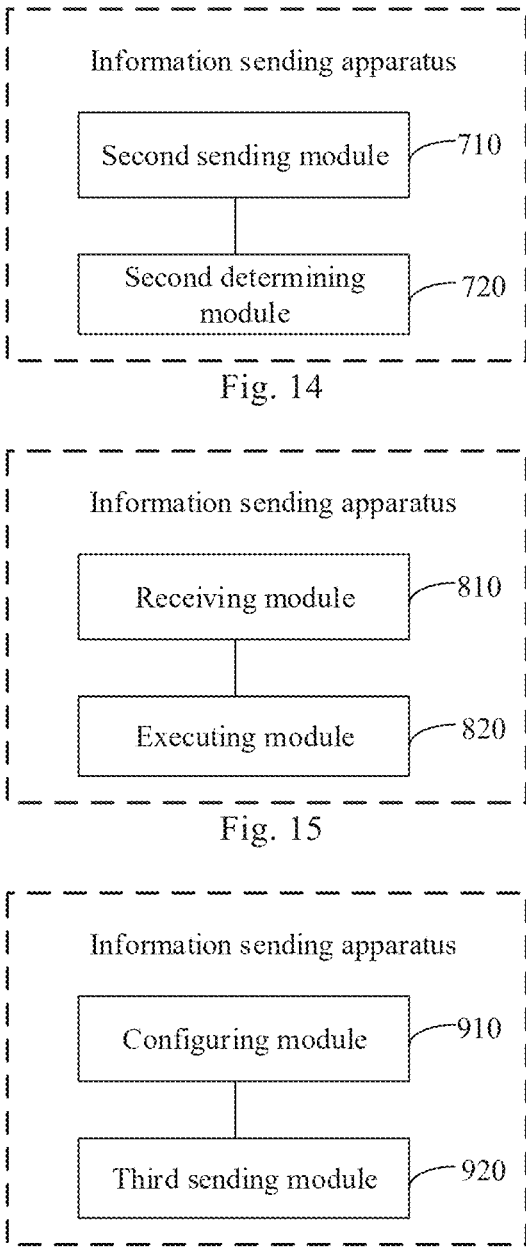
FIG. 14 is a block diagram of another information sending apparatus according to an embodiment.
FIG. 15 is a block diagram of another information sending apparatus according to an embodiment.
FIG. 16 is a block diagram of another information sending apparatus according to an embodiment.

Referring to FIG. 14, FIG. 14 is a block diagram of another information sending apparatus according to an embodiment, the apparatus is used for the second base station, the second base station is a base station where the second SIM card of the multi-card terminal resides, including: a second sending module 710, configured to send the paging message for paging the second SIM card to the second SIM card; and a second determining module 720, configured to determine that the second SIM card has received the paging message but does not respond to a paging in response to receiving target indication information sent by the second SIM card.

Referring to FIG. 15, FIG. 15 is a block diagram of another information sending apparatus according to an embodiment, the apparatus is used for the first SIM card of the multi-card terminal, including: a receiving module 810, configured to receive configuration information which is sent by the first base station and corresponds to the target mode; wherein the first base station is a base station accessed by the first SIM card; and a executing module 820, config- ured to perform service communication with the first base station when the target mode is in an on state after deter- mining that the target mode is activated.

Referring to FIG. 16, FIG. 16 is a block diagram of another information sending apparatus according to an embodiment, the apparatus is used for the first base station, the first base station is a base station accessed by the first SIM card of the multi-card terminal, including: a configur- ing module 910, configured to configure the target mode for the first SIM card; wherein the target mode is used to indicate a state mode in which the first SIM card performs service communication with the first base station; and a third sending module 920, configured to send the configuration information corresponding to the target mode to the first SIM card.

For the apparatus embodiments, since they basically correspond to the method embodiments, reference may be made to the corresponding parts of the description of the method embodiments for relevant details. The apparatus embodiments described above are only illustrative, where the units described as separate components may or may not be physically separated, and the components displayed as units may or may not be physical units, that is, they may be located in one place, or may be distributed in a plurality of network units. Part or all of the modules may be selected according to actual needs to achieve the purposes of the solution of the present disclosure. Those of ordinary skill in the art may understand and implement them without any creative work.

Accordingly, the present disclosure also provides a com- puter-readable storage medium, the storage medium stores a computer program for executing the information sending method for any one of the multi-card terminal sides.

Accordingly, the present disclosure also provides a com- puter-readable storage medium, the storage medium stores a computer program for executing the information sending method for any one of the base station side. The base station side may refer to the first base station or the second base station, and the first base station and the second base station may be the same or different.

Accordingly, the present disclosure also provides infor- mation sending apparatus, including: a processor; and a memory for storing an instruction executable by the proces- sor; wherein the processor is configured to execute the information sending method described in any one of the multi-card terminal sides corresponding to the first SIM card or the second SIM card.

Figure 17:
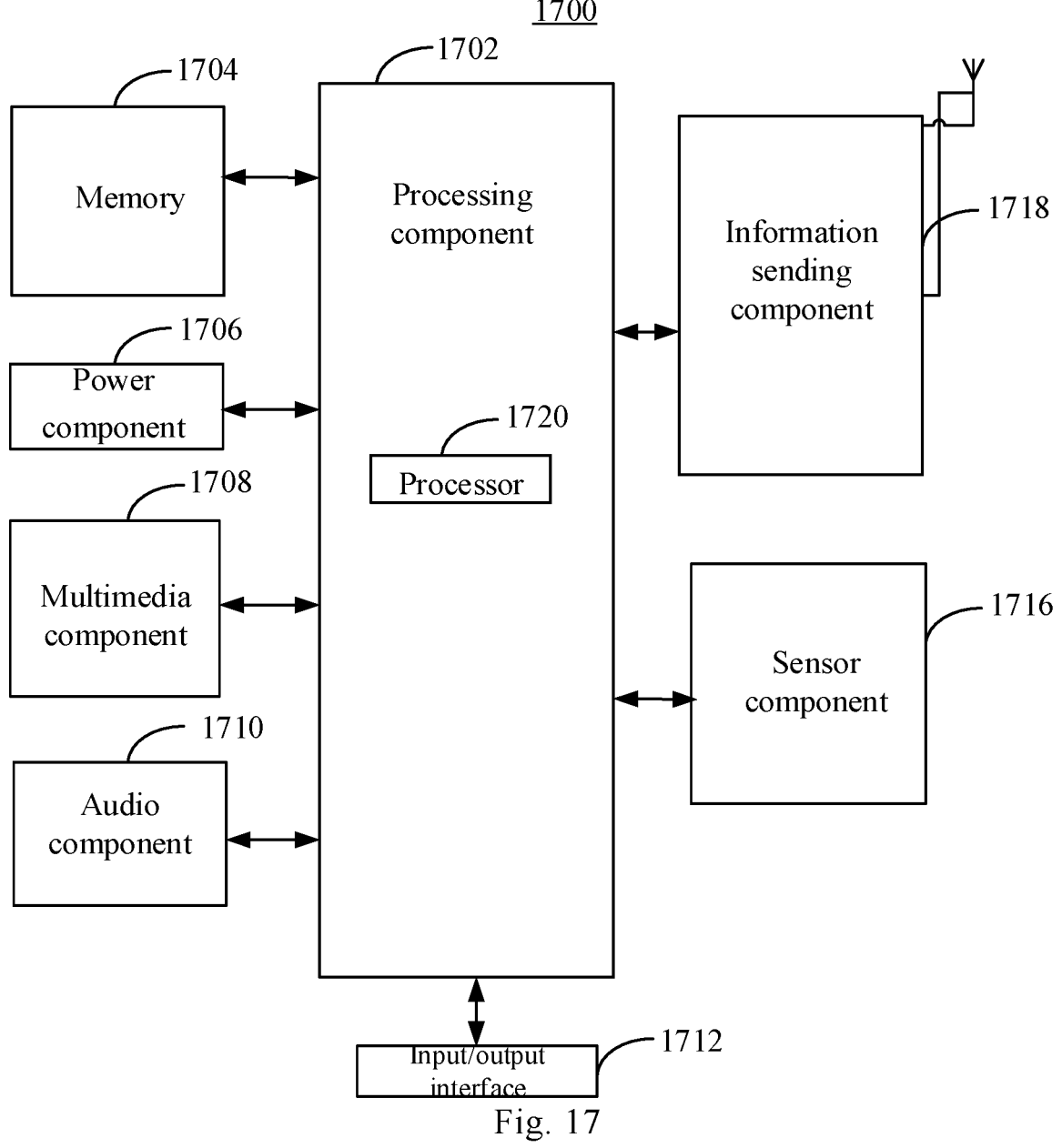
FIG. 17 is a schematic structural diagram of information sending apparatus according to an embodiment of the present disclosure.

FIG. 17 is a block diagram of an electronic device 1700 according to an embodiment. For example, the electronic device 1700 may be a mobile phone, a tablet computer, an e-book reader, a multimedia playback device, a wearable device, a vehicle-mounted terminal, an ipad, a smart TV, or the like including a multi-card terminal of a plurality of SIM cards.

Referring to FIG. 17, the electronic device 1700 may include one or more of the following components: a pro- cessing component 1702, a memory 1704, a power compo- nent 1706, a multimedia component 1708, an audio com- ponent 1710, an input/output (I/O) interface 1712, a sensor component 1716, and an information sending component 1718.

The processing component 1702 generally controls the overall operation of the electronic device 1700, such as operations associated with display, phone calls, data infor- mation sending, camera operations, and recording opera- tions. The processing component 1702 may include one or more processors 1720 to execute instructions to perform all or some of the steps of the information sending method described above. Additionally, the processing component 1702 may include one or more modules that facilitate interaction between the processing component 1702 and other components. For example, the processing component 1702 may include a multimedia module to facilitate inter- action between the multimedia component 1708 and the processing component 1702. As another example, the pro- cessing component 1702 may read executable instructions from memory to implement the steps of an information sending method provided by various embodiments described above.

The memory 1704 is configured to store various types of data to support operations at the electronic device 1700. Examples of such data include instructions for any application or method operating on the electronic device 1700, contact data, phonebook data, messages, pictures, videos, and the like. The memory 1704 may be implemented by any type of volatile or non-volatile storage device or combination thereof, such as Static Random Access Memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk.

The power component 1706 provides power to the various components of the electronic device 1700. The power components 1706 may include a power management system, one or more power supplies, and other components associated with generating, managing, and distributing power to the electronic device 1700.

The multimedia component 1708 includes a display screen that provides an output interface between the electronic device 1700 and a user. In some embodiments, the multimedia component 1708 includes a front-facing camera and/or a rear-facing camera. The front-facing camera and/or the rear-facing camera may receive external multimedia data when the electronic device 1700 is in an operating mode, such as a shooting mode or a video mode. Each of the front-facing and rear-facing cameras may be a fixed optical lens system or have focal length and optical zoom capability.

The audio component 1710 is configured to output and/or input audio signals. For example, the audio component 1710 includes a microphone (MIC) that is configured to receive external audio signals when the electronic device 1700 is in an operational mode, such as a call mode, a recording mode, and a voice recognition mode. The received audio signal may be further stored in the memory 1704 or sent via the information sending component 1718. In some embodiments, the audio component 1710 also includes a speaker for outputting audio signals.

The I/O interface 1712 provides an interface between the processing component 1702 and a peripheral interface module, which may be a keyboard, a click wheel, a button, or the like. These buttons may include, but are not limited to: a home button, a volume button, a start button, and a lock button.

The sensor component 1716 includes one or more sensors for providing status assessment of various aspects of the electronic device 1700. For example, the sensor component 1716 may detect the on/off state of the electronic device 1700, and the relative positioning of components, such as a display and a keypad of the electronic device 1700. The sensor component 1716 may also detect a change in the position of the electronic device 1700 or a component of the electronic device 1700, presence or absence of the contact of the user with the electronic device 1700, orientation or acceleration/deceleration of the electronic device 1700 and a change in the temperature of the electronic device 1700. The sensor component 1716 may include a proximity sensor configured to detect the presence of a nearby object in the absence of any physical contact. The sensor component 1716 may also include a light sensor, such as a CMOS or CCD image sensor, for use in imaging applications. In some embodiments, the sensor component 1716 may also include an acceleration sensor, a gyroscope sensor, a magnetic sensor, a pressure sensor, or a temperature sensor.

The information sending component 1718 is configured to facilitate information transmission between the electronic device 1700 and other devices in a wired or wireless manner. The electronic device 1700 may access a wireless network based on an information sending standard, such as Wi-Fi, 2G, 3G, 4G, 5G, or 6G, or a combination thereof. In one embodiment, the information sending component 1718 receives a broadcast signal or broadcast associated information from an external broadcast management system via a broadcast channel. In one embodiment, the information sending component 1718 further includes a near field communication (NFC) module to facilitate short-range information sending. For example, the NFC module may be implemented based on Radio Frequency Identification (RFID) technology, infrared data association (IrDA) technology, Ultra-Wideband (UWB) technology, Bluetooth (BT) technology, and other technologies.

In embodiments, the electronic device 1700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic elements to perform the above information sending method.

In embodiments, a non-transitory machine-readable storage medium including instructions, for example, the memory 1704 including instructions is also provided, and the above instructions may be executed by the processor 1720 of the electronic device 1700 complete the above wireless charging method. For example, the non-transitory computer-readable storage medium may be a ROM, a Random Access Memory (RAM), a CD-ROM, a magnetic tape, a floppy disk, an optical data storage device, and the like.

Accordingly, the present disclosure also provides information sending apparatus, including: a processor; and a memory for storing an instruction executable by the processor; wherein the processor is configured to execute the information sending method described in any one of the above base station sides.

As shown in FIG. 18, FIG. 18 is a schematic structural diagram of another information sending apparatus 1800 according to an embodiment. The apparatus 1800 may be provided as a base station. Referring to FIG. 18, the apparatus 1800 includes a processing component 1822, a wireless sending/receiving component 1824, an antenna component 1826, and a signal processing portion specific to the wireless interface, and the processing component 1822 may further include one or more processors.

One of the processors in the processing component 1822 may be configured to execute the information sending method described in any of the base station sides above.

Other embodiments of the present disclosure will be apparent to those skilled in the art from consideration of the specification and practice of the invention disclosed herein. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It should be understood that the present disclosure is not limited to the exact construction that has been described above and illustrated in the accompanying drawings, and that various modifications and changes can be made without departing from the scope thereof. The scope of the present disclosure is limited only by the appended claims.

What is claimed is:

1. An information sending method, comprising:

in response to determining that a first Subscriber Identity Module (SIM) card of a multi-card terminal is in service and detecting a paging message for paging a second SIM card that is sent by a second base station, determining, by the second SIM card of the multi-card terminal, whether to respond to the paging message, wherein the second base station is a base station where the second SIM card resides; and sending, by the second SIM card of the multi-card terminal, target indication information to the second base station in response to determining to refrain from responding to the paging message, wherein the target indication information is configured to inform the second base station that the second SIM card has received the paging message and to refrain from responding to the paging message; wherein the target indication information comprises one of reserved preambles, the reserved preambles are configured by the second base station, the reserved preambles are configured to indicate that a corresponding SIM card has received the paging message and refrains from responding to the paging message, and the SIM cards refrain from using the reserved preambles for random access.

2. The method according to claim 1, wherein determining whether to respond to the paging message comprises:

determining to refrain from responding to the paging message in response to that a target condition for refraining from responding to the paging message is met.

3. The method according to claim 2, wherein the target condition comprises any one of the following:

a service priority of a first service corresponding to the paging message is lower than a service priority of a second service currently performed by the first SIM card; or responding to the paging message affects service quality of the second service currently performed by the first SIM card.

4. The method according to claim 2, further comprises:

receiving the target condition sent by the second base station through a first signaling; or receiving the target condition sent by the first SIM card; or determining the target condition according to configuration of the multi-card terminal.

5. The method according to claim 1, wherein sending the target indication information to the second base station comprises: sending one of the reserved preambles and identification information of the second SIM card to the second base station.

6. The method according to claim 5, wherein sending the target indication information to the second base station comprises:

in response to determining that a target mode corresponding to the first SIM card is activated and the target mode is currently in an off state, sending the target indication information to the second base station; wherein the target mode is configured to indicate a state mode in which the first SIM card performs service communication with a first base station.

7. An information sending method performed by a second base station, wherein the second base station is a base station where a second Subscriber Identity Module (SIM) card of a multi-card terminal resides, the method comprises:

sending a paging message for paging the second SIM card to the second SIM card; and determining that the second SIM card has received the paging message and refrains from responding to the paging message in response to receiving target indication information sent by the second SIM card; wherein the target indication information is sent to the second base station when a first SIM card of the multi-card terminal is in service and the second base station detects the paging message, and refrains from responding to the paging message, and wherein the target indication information comprises one of reserved preambles, the reserved preambles are configured by the second base station, the reserved preambles are configured to indicate that a corresponding SIM card has received the paging message and refrains from responding to the paging message, and the SIM cards refrain from using the reserved preambles for random access.

8. The method according to claim 7, further comprises:

refraining from triggering a target operation;

wherein refraining from triggering the target operation comprises at least one of the following:

refraining from triggering an operation of determining that the second SIM card is in an off state;

refraining from triggering an operation of determining that a tracking area where the second SIM card is located has changed; and refraining from triggering an operation of re-paging the second SIM card within the target duration.

9. The method according to claim 7, further comprises:

configuring a target condition; wherein in response to determining that the target condition is met, the second SIM card determines to refrain from responding to the paging message in a case that a first SIM card is in service and a paging message for paging the second SIM card that is sent by the second base station is detected; and sending the target condition to the second SIM card through a first signaling.

10. The method according to claim 9, wherein the target condition comprises any one of the following:

a service priority of a first service corresponding to the paging message is lower than a service priority of a second service currently performed by the first SIM card; or responding to the paging message affects service quality of the second service currently performed by the first SIM card.

11. An information sending method, comprising:

receiving, by a first Subscriber Identity Module (SIM) card of a multi-card terminal, configuration information sent by a first base station and corresponding to a target mode; wherein the first base station is a base station accessed by the first SIM card; and performing, by the first SIM card of the multi-card terminal and in response to determining that the target mode is activated and the target mode is in an on state, service communication with the first base station, wherein when a second SIM card of the multi-card terminal determines that the target mode corresponding to the first SIM card is activated and the target mode is in an off state, the second SIM card sends target indication information to a second base station in response to determining that the first SIM card of the multi-card terminal is in service and detecting a paging message for paging the second SIM card that is sent by the second base station, wherein the second base station is a base station where the second SIM card resides;

wherein the target indication information is configured to inform the second base station that the second SIM card has received the paging message and refrains from responding to the paging message; wherein the target indication information comprises one of reserved preambles, the reserved preambles are configured by the second base station, the reserved preambles are configured to indicate that a corresponding SIM card has received the paging message and refrains from responding to the paging message, and the SIM cards refrain from using the reserved preambles for random access.

12. The method according to claim 11, further comprises:

sending paging related information corresponding to the second SIM card of the multi-card terminal to the first base station;

wherein the paging related information comprises paging occasion related information.

13. The method according to claim 11, further comprises:

sending a request message to the first base station; wherein the request message is configured to request the first base station to configure the target mode for the first SIM card;

wherein receiving configuration information sent by the first base station and corresponding to the target mode comprises:

receiving the configuration information configured for the first SIM card by the first base station based on the request message and corresponding to the target mode;

wherein the request message carries paging related information corresponding to the second SIM card of the multi-card terminal.

14. The method according to claim 11, further comprises:

activating the target mode in response to receiving the configuration information.

15. The method according to claim 11, further comprises:

receiving an activation condition for activating the target mode sent by the first base station;

activating the target mode in response to that the activation condition is met; and sending a notification message to the first base station in response to determining that the target mode is activated, wherein the notification message is configured to inform the first base station that the target mode is activated.

16. The method according to claim 11, further comprises:

activating the target mode in response to receiving activation indication information sent by a second SIM card of the multi-card terminal, wherein the activation indication information is configured to indicate that an activation condition for activating the target mode is met.

17. The method according to claim 11, further comprises:

receiving a target condition sent by the first base station through a second signaling; wherein in response to that the target condition is met, the second SIM card determines not to respond to a paging in a case that the first SIM card is in service and a paging message for paging the second SIM card sent by the second base station is detected; and sending the target condition to the second SIM card.

18. The method according to claim 17, wherein the target condition comprises any one of the following:

a service priority of a first service corresponding to the paging message is lower than a service priority of a second service currently performed by the first SIM card; or responding to the paging affects service quality of the second service currently performed by the first SIM card.

* * * * *